(12) United States Patent
Stangier et al.

(10) Patent No.: US 6,556,918 B2
(45) Date of Patent: Apr. 29, 2003

(54) METHOD FOR IDENTIFYING A PLACE, AND TERMINAL AND CENTRAL UNIT THEREFOR

(75) Inventors: Peter Stangier, Wesseling (DE); Ralf Kolb, Willich (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/331,092

(22) PCT Filed: Dec. 15, 1997

(86) PCT No.: PCT/DE97/02972

§ 371 (c)(1),
(2), (4) Date: Jun. 16, 1999

(87) PCT Pub. No.: WO98/27531

PCT Pub. Date: Jun. 25, 1998

(65) Prior Publication Data

US 2002/0049528 A1 Apr. 25, 2002

(30) Foreign Application Priority Data

Dec. 16, 1996 (DE) .......................................... 196 53 692
Nov. 24, 1997 (DE) .......................................... 197 54 336

(51) Int. Cl.⁷ .......................... G01C 21/00; G06G 7/78; G06F 17/20; G06F 15/00
(52) U.S. Cl. ...................... 701/208; 701/200; 701/209; 701/210; 704/7; 707/534
(58) Field of Search ................ 701/209, 208, 701/210, 200; 704/7; 707/534

(56) References Cited

U.S. PATENT DOCUMENTS

| | | | | |
|---|---|---|---|---|
| 4,339,806 A | * | 7/1982 | Yoshida ........................ | 704/7 |
| 4,438,505 A | * | 3/1984 | Yanagiuchi et al. ........... | 704/7 |
| 4,597,056 A | * | 6/1986 | Washizuka ..................... | 704/7 |
| 4,951,212 A | * | 8/1990 | Kurihara et al. ............. | 369/449 |
| 5,191,532 A | * | 3/1993 | Moroto et al. ............... | 701/201 |
| 5,805,911 A | * | 9/1998 | Miller ......................... | 395/796 |
| 5,808,566 A | * | 9/1998 | Behr et al. .................. | 340/995 |
| 5,819,200 A | * | 10/1998 | Tamai et al. ................. | 701/208 |
| 5,825,306 A | * | 10/1998 | Hiyokawa et al. ............ | 340/988 |
| 5,832,408 A | * | 11/1998 | Tamai et al. ................. | 701/208 |
| 5,911,773 A | * | 6/1999 | Mutsuga et al. ............. | 701/200 |
| 5,987,381 A | * | 11/1999 | Oshizawa ..................... | 701/209 |
| 6,038,508 A | * | 3/2000 | Maekawa et al. ............ | 701/207 |
| 6,088,649 A | * | 7/2000 | Kadaba et al. .............. | 701/201 |
| 6,088,713 A | * | 7/2000 | Okuda et al. ................ | 707/534 |

* cited by examiner

Primary Examiner—Jacques H. Louis-Jacques
Assistant Examiner—Brian J. Broadhead
(74) Attorney, Agent, or Firm—Cohen, Pontani, Lieberman & Pavane

(57) ABSTRACT

A convenient, trouble-proof, economical identification of a place, especially for remote-controlled navigation of a vehicle through a traffic network, is made possible by a terminal unit, a central station and a method for identifying a name via the terminal unit, especially for identifying an interrogated name of a starting location or destination or current location of a route in a navigation terminal unit based on a plurality of characters which are a component of the name and are interrogated in the terminal unit as a character string. It it is determined whether or not the interrogated character string corresponds to the start of a character string contained in a list of exceptions. This latter character string being contained in a plurality of names. The user is asked to enter additional characters of the name when it is determined that the interrogated character string is contained in the exception list, while a process for unambiguous identification is introduced without further characters of the name being entered when it is determined that the interrogated character string is not contained in the exception list.

11 Claims, 3 Drawing Sheets

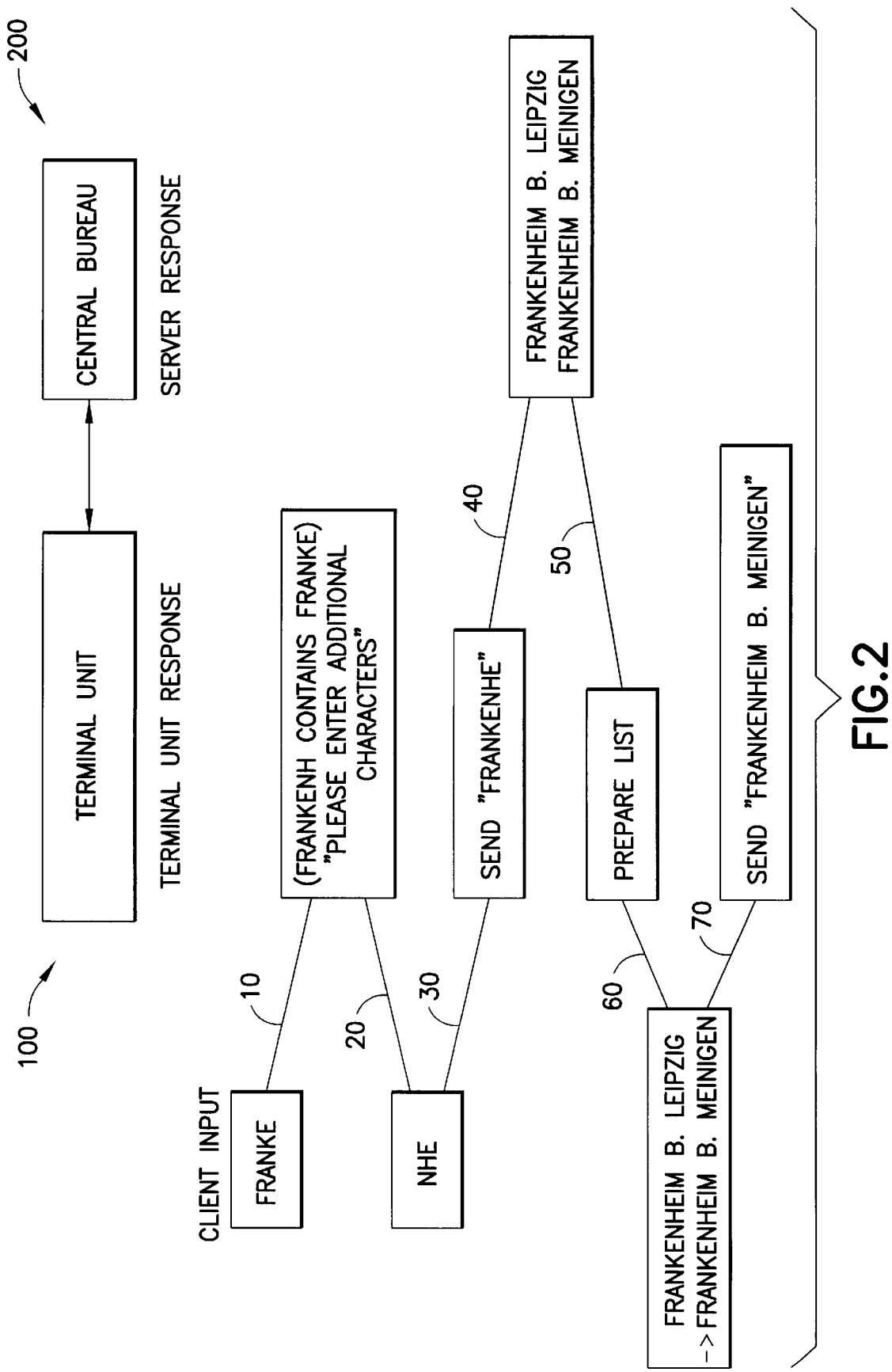

Ahrens Alten Asbach August Bad  Bahren Behren Beiers Berg  Bergen Birken

Birkho Bischo Blanke Blumen Brauns Breite Briese Buch  Buckow Burg  Burk  Charlo Christ Deutsc Ditter Ebersb Eggers Eichen Engels Erlenb Eschen Fahren Falken Fichte Fischb Franke Frauen Freien Freude Fried  Fürste Gersdo Giesen Glashü Grab Grafen Greven Groß  Gräfen Göhren Hammer Hartma Hassel Hausen Heiden Heilig Hein  Herm  Herren Hersch Himmel Hinter Hirsch Hochst Hohe  Holzha Horst Hütten Insel Kaiser Kalten Karlsh Kirch  Kirsch Klein  Klinge Kloste Krumme Kummer Kurort Königs Langen Lauter Lichte Lieben Limbac Linden Ludwig Lüders Marien Markt  Martin Michel Mittel Möllen Mühl  Münche Münste Naundo Neckar Neu Nieder >Niendo Norder Ober  Ost  Otters Peters Pfaffe Philip Pinnow Poppen Reiche Reinsd Rieden Ritter Rosen Roth  Rotten Rupper Rücker Sachse Schach Schell Schenk Schier Schlag Schlei Schleu Schlie Schloß Schmal Schmer Schmie Schulz Schwa  Schwe  Schön  Seehau Silber Simmer Sommer Sonnen Sophie Stein  Stolpe Streit Sulzba Tiefen Unter Vogels Wald  Wallen Walter Wasser Weiden Weiler Weite Weiß  Wend  Werder Wessel Wester

FIG. 3

METHOD FOR IDENTIFYING A PLACE, AND TERMINAL AND CENTRAL UNIT THEREFOR

PRIORITY CLAIM

This is a U.S. national stage of application No. PCT/DE97/02972, filed on Dec. 15, 1997. Priority is claimed on that application and on the following application(s) Country: Germany, Application No.: 196 53 692.8, Filed: Dec. 16, 1996; Country: Germany, Application No.: 197 54 336.7, Filed: Nov. 24, 1997.

BACKGROUND OF THE INVENTION

1. Field of the Invention

The invention is directed to a method for the identification of a location, and to a terminal unit and central station.

2. Discussion of the Prior Art

The identification of a location by means of input into a terminal unit can be used for different purposes. In particular, it is advantageous for the identification of an interrogated starting location, destination, etc. for a desired route in a navigation device. In remote-controlled (offboard) navigation, the information must be sent from the terminal unit to a central station. In this regard, location designations can be very long, so that the effort involved in input into the terminal unit and in sending from the terminal unit to a central traffic station is relatively great. The problem in implementing the possibility of entering a location designation in the terminal unit in truncated (abbreviated) form and completing the abbreviated location based on an address file in the terminal unit consists in that the terminal unit must contain a complete list of locations, and correction or updating is time-consuming. Entering individual characters with immediate transmission from the terminal unit to the central traffic station and the sending back of locations identifiable by the previously entered characters is relatively expensive due to the required telecommunications and, in the case of packet-mode data transfer, is technologically demanding and inconvenient to operate due to the transit times and differences in transit time for different packets. One reason for this is the relatively large positive list (namely, the list of location designations which start with the character string that was entered in the terminal unit). However, the transmission of a complete location designation is prone to error and inconvenient with respect to inputting and is time-consuming and expensive with respect to transmission; beyond this, its form may not necessarily be compatible with its form in the list of location designations in the central station (Frankfurt a.M. or Frankfurt am Main).

SUMMARY OF THE INVENTION

Therefore, the object of the invention is an identification of a location designation, especially a location designation relating to a requested route in a navigation terminal unit, which is as simple, ergonomic, efficient and trouble-proof as possible, economizes on telecommunications costs and which is nevertheless compatible between the terminal unit and the central station.

The invention enables a simple, ergonomic, trouble-proof identification of a place by the user of a terminal unit, especially by the driver of a vehicle with a navigation terminal unit, which is advantageous with respect to transmission and is nevertheless compatible between the terminal unit and the central station. For this purpose, the terminal unit does not require a large storage of the type needed for complete storage of all of the locations in the terminal unit, so that the terminal unit can be constructed in an economical manner. The list of location designations can be updated in a simple manner. The location designation may be, for example, a city, a road, a partial area of a road, an intersection, geographic information such as mountain, hill, valley, a bridge, etc., a part of a city, a public building, etc. It is suitable particularly for identification of places, such as cities or highways, that are designated as a whole.

The characters entered can be, in particular, numbers and/or letters. A character string is a series of characters, especially in the sequence in which they are entered. The interrogated character string can appear in different positions in a location designation; in particular, it can be the start of a location designation; in particular, it can be compared with the start of location designations. The positive list is a list of location designations which are known in the central station. An exception list is a list of character strings (entered characters) with which too many names on the position list start, so that the transmission of all of these names in the positive list from the central station to the terminal unit for the selection of the desired name would be too extensive.

The method can be realized in different ways. The positive list is advisably stored in the central station.

The exception list can be stored in the terminal unit and/or in the central station. It can be determined in the central station or, particularly, in the terminal unit whether the interrogated character string is contained in the exception list.

The transmission from the terminal unit to the central station is advisably carried out via radio, especially via mobile radio. Packet mode can be carried out in particular by means of short messages such as GSM SMS.

The method can be realized in a terminal unit and/or in a central station especially as a program. At least portions of the program are implemented in the terminal unit and in the central station for interrogation, communications and for access to data stored therein. Which program parts are used and where the program parts are used depends on the way in which the method is actually configured.

Further features and advantages of the invention are indicated in the following description of an embodiment example with reference to the drawing.

BRIEF DESCRIPTION OF THE DRAWINGS

FIG. 2 shows a user-terminal unit-server (=central station) partial communications record for an example of interactive identification of a location;

FIG. 3 shows an example of an exception list for location designations as names of German cities with a maximum character number of six characters.

DETAILED DESCRIPTION OF THE PREFERRED EMBODIMENTS

Figure 1:
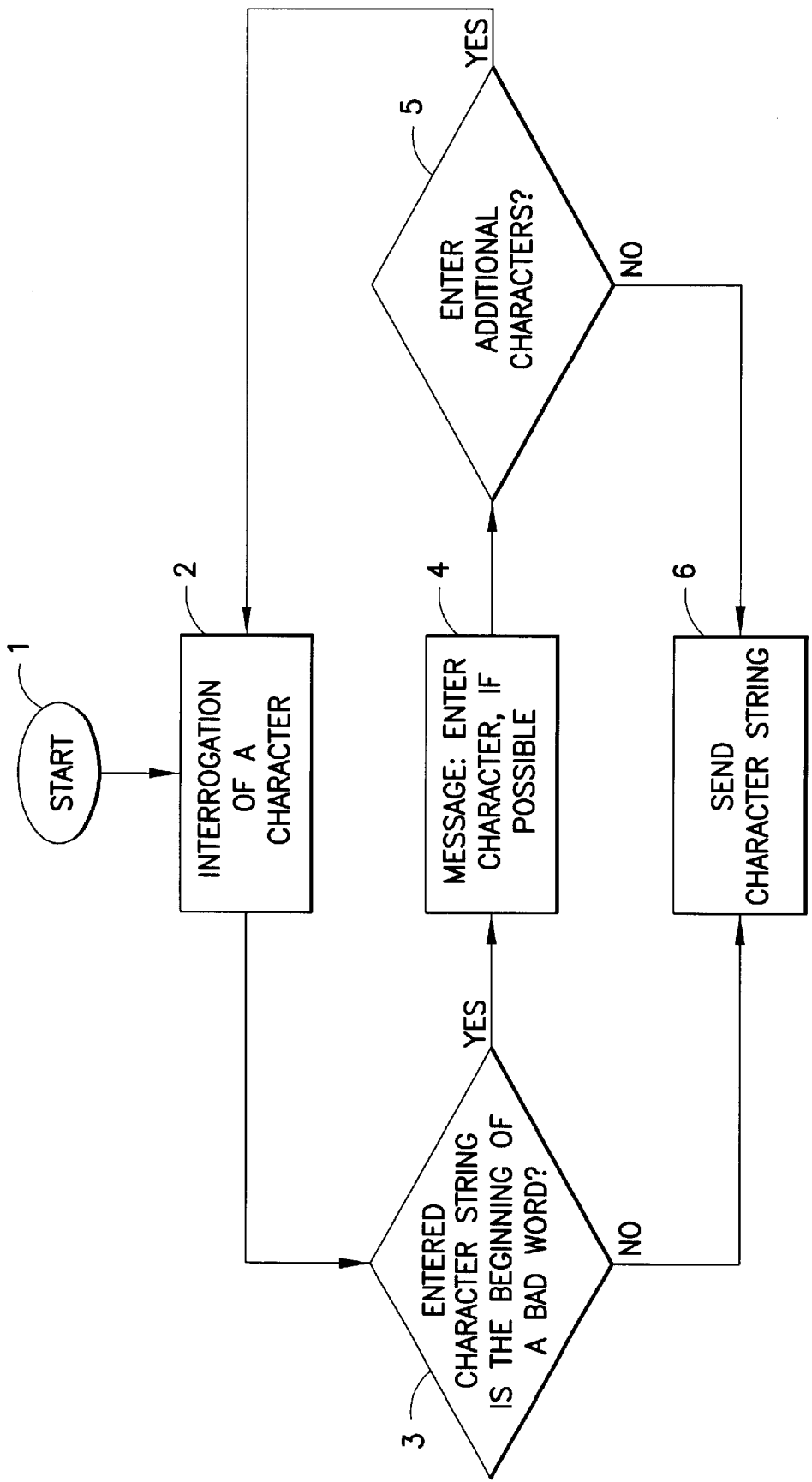
FIG. 1 shows a highly schematic flow chart of a realization of the method with an exception list implemented in the terminal unit.

A user of a terminal unit 100 wants to communicate a place name to a central station 200 connected with the terminal unit by entering the place name in the terminal unit. For this purpose, it is necessary that the location intended by the user is identified in an unambiguous manner in the central station. This entering and identifying of locations is required particularly in traffic navigation of a vehicle with a terminal unit by a central station via radio. For this purpose, for example, the starting location and/or destination of a route for which the user of the terminal unit wants navigation assistance from the central station via the terminal unit and/or an input of the current location, for example, of a road, place sign, etc. read by the user from the side of the road is interrogated for detecting the position of the terminal unit.

In different cases of application, such as entering a place designation in the vehicle for purposes of navigation, the place designation should be entered as briefly as possible. For this purpose, a character string is queried in the terminal unit. For example, a plurality of characters can be typed in successively or entered by speech input and put together to form a character string or a character string is detected acoustically through speech.

FIG. 1 shows in a highly schematic manner an example of a realization of the interactive interrogation of a location for identification in the terminal unit, wherein an exception list (also referred to as a "bad word list" of "bad words") is implemented in the terminal unit.

The program starts at Start 1. A character is first interrogated in step 2. After this, in step 3, a check is carried out as to whether or not the queried character string is contained in the exception list (contained in the central station in this case) of character strings forming the start of a number of names. If the character string that has been entered is contained in the exception list, the terminal unit is requested by the central station to request (via a message 4.) the user of the terminal unit to enter further characters. If the user (decision 5 in FIG. 1) wants to enter additional characters, the process proceeds with step 2, wherein at least one additional character is entered. The wish to input additional characters can be entered (="Yes" in step 5), for example, by entering an additional character.

If the user does not want to enter any additional characters in step 5, i.e., when the user presses a certain button, for example, the process proceeds to step 6. In this step, all of the character strings starting with the previously entered character string are sent; this will be a plurality of character strings when character strings contained in the exception list are entered. It is also possible to send only some of the character strings in a positive list in the central station which start with the entered character string and, in case the user wanted to send an additional character string starting with the entered character string, the additional character strings can be sent in a further step. In a step which is not shown in the drawing, the user of the terminal unit can select a character string from the character strings that are sent.

In the case shown in the drawing, a character in the exception list has a length 1 because a check is conducted as soon as a character is interrogated as to whether or not the interrogated character (=interrogated character string in this case) is contained in the exception list. In the event that all character strings in the exception list have a determined minimum length, a step in which a minimum number of characters is interrogated can be added between step 1 and step 2.

In the present case, the exception list, that is, the list with character strings with which a plurality of name character strings begin, is stored in the central station. Further, the positive list of character strings, that is, the list of all relevant names, is also contained in the central traffic station in this case. Accordingly, only interrogation of characters of the entered character string and display of unambiguous names, or a plurality of names, transmitted from the central station to the terminal unit is carried out for the user in the terminal unit.

The quantity of names that must begin by an input character string so that this input character string (that is, this beginning of a plurality of names) is contained in an exception list depends on different conditions, in this case especially on the transmission channel. For example, when five names (=character strings of the positive list) beginning with the entered character string can be efficiently sent from the central station to the terminal unit, it is useful to adopt in the exception list the character strings with which more than five names begin.

FIG. 2 shows an example of the communication between a terminal unit user (client), a terminal unit and a central station (server).

In the example in FIG. 2, the user of the terminal unit first enters 10 the characters F, R, A, N, K, E. These characters are contained in an exception list, which, in this case, is contained in the terminal unit, because too many names (in this case, location designations) begin with "Franke". Therefore, the user is requested 20 to enter additional characters of the desired name. The user of the terminal unit then enters 30 the characters N, H, E, so that the input character string is supplemented to form "Frankenh". This character string is sent 40 to the central station. The central station determines from the positive list of these names (character strings) contained in the central station the names that begin with the entered character string, namely, "Frankenheim bei Leipzig" and "Frankenheim bei Meinigen". These (two, in this case) character strings of the positive list are sent 50 from the central station to the terminal unit. The terminal unit displays 60 the list of the two names in question to the client. The client selects 70 the second of these two names, i.e., Frankenheim bei Meinigen. For further use, the terminal unit then sends the location "Frankenheim bei Meinigen" to the central station, where it can be further used in a suitable manner; in particular, an identified location can be a destination, starting location, etc. for a route inquiry by a user of a terminal unit to the central station.

FIG. 3 shows an example of an exception list for the example using German city names, that is, character strings with which more than six German city names begin. The length of the character strings contained in the exception list in FIG. 3 differs in this example.

What is claimed is:

1. A method for identifying a name of a starting location or destination or current location of a route in a navigation terminal unit based on a plurality of characters which are a component of the name, comprising the steps of:

storing a positive list of names in a central station;

entering the characters into the terminal unit;

interrogating the characters in the terminal unit as a character string;

determining whether the interrogated character string corresponds to a start of a further character string contained in a list of exceptions, the further character string being contained in a plurality of names, the determining being carried out in the terminal unit;

storing the exception list in the terminal unit, the exception list is a list of character strings which form beginnings of the names in the positive list, the names being in a quantity such that a transmission of the names from the central station to the terminal unit would cause an effort lying above a limit value;

asking a user to selectively enter additional characters of the name when it is determined that the interrogated character string is contained in the exception list;

introducing a process for unambiguous identification without further characters of the name being entered when it is determined that the interrogated character string is not contained in the exception list; and transmitting at least a portion of the names from the positive list of the central station which begin with the interrogated character string when it is determined that the interrogated character string is contained in the exception list to the terminal unit for further selection when a terminal unit user selects not to enter any additional characters of the name requested by the user.

2. A method according to claim 1, wherein character strings which form beginnings of one of five and six names are contained in the exception list.

3. A method according to claim 1, including transmitting all of the names beginning with the entered character string from a positive list from a central station to the terminal unit when it is determined that the interrogated character string is not contained in the exception list but a name is still not unambiguously identified.

4. A method according to claim 1, wherein character strings up to seven characters are contained in the exception list.

5. A method according to claim 1, including transmitting at least one of from the terminal unit to the central station and from the central station to the terminal unit via radio.

6. A method according to claim 1, including transmitting at least one of from the terminal unit to the central station and from the central station to the terminal unit via packet mode.

7. A method according to claim 1, including transmitting at least one of from the terminal unit to the central station and from the central station to the terminal unit via short message.

8. A terminal unit, comprising:

a storage with a program stored in the storage for carrying out a method for identifying a name of a starting location or destination or current location of a route in the navigation terminal unit based on a plurality of characters which are a component of the name, the method including entering the characters into the terminal unit, interrogating the characters in the terminal unit as a character string, determining whether the interrogated character string corresponds to a start of a further character string contained in a list of exceptions, the further character string being contained in a plurality of names, asking a user to enter additional characters of the name when it is determined that the interrogated character string is contained in the exception list, and introducing a process for unambiguous identification without further characters of the name being entered when it is determined that the interrogated character string is not contained in the exception list, the exception list being held in the storage and being a list of character strings which form beginnings of the names in the positive list, the names being in a quantity such that a transmission of the names from a central station to the terminal unit would cause an effort lying above a limit value;

a process for running the program so that the determining is carried out; and a communications device for communicating with the central station.

9. A central station according to claim 8, wherein the communications device is a radio device.

10. A central station, comprising:

a storage containing a positive list of names;

a program stored in the storage for carrying out a method for identifying a name of a starting location or destination or current location of a route in a navigation terminal unit based on a plurality of characters which are a component of the name, the method including entering the characters into the terminal, interrogating the characters in the terminal unit as a character string, determining whether the interrogated character string corresponds to a start of a further character string contained in a list of exceptions, the further character string being contained in a plurality of names, asking a user to enter additional characters of the name when it is determined that the interrogated character string is contained in the exception list, and introducing a process for unambiguous identification without further characters of the name being entered when it is determined that the interrogated character string is not contained in the exception list, the exception list being a list of character strings which form beginnings of the names in the positive list, the names being in a quantity such that a transmission of the names from the central station to the terminal unit would cause an effort lying above a limit value;

a process for running the program; and a communication device for communicating with at least one terminal unit.

11. A central station according to claim 10, wherein the communications device is a radio device.

* * * * *